Nov. 17, 1942.  F. W. MANNING  2,302,622
CONTINUOUS DEPTH FILTER HAVING AN INTERIOR CYLINDRICAL RETAINING WALL
Filed March 31, 1939  3 Sheets-Sheet 3
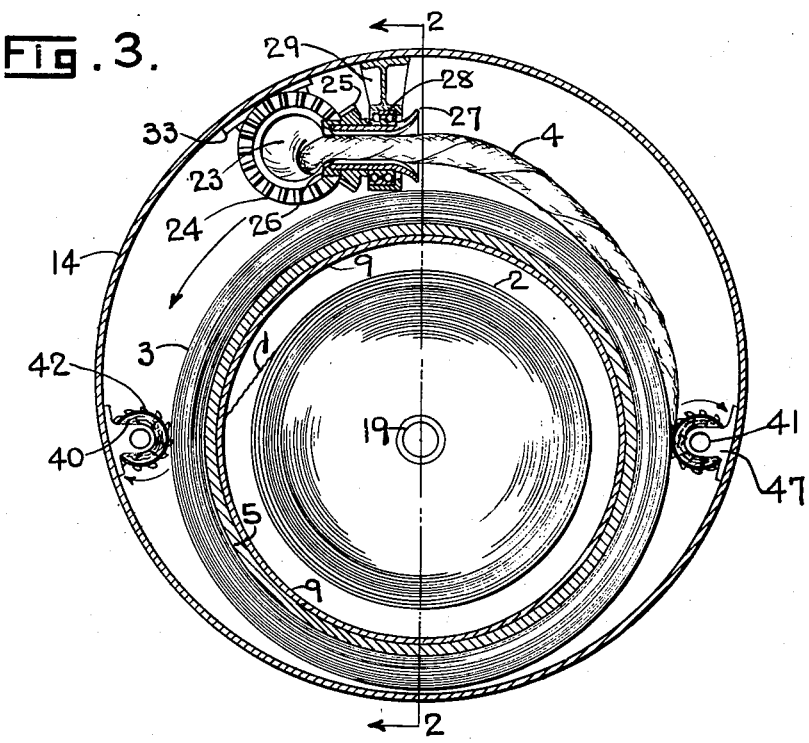
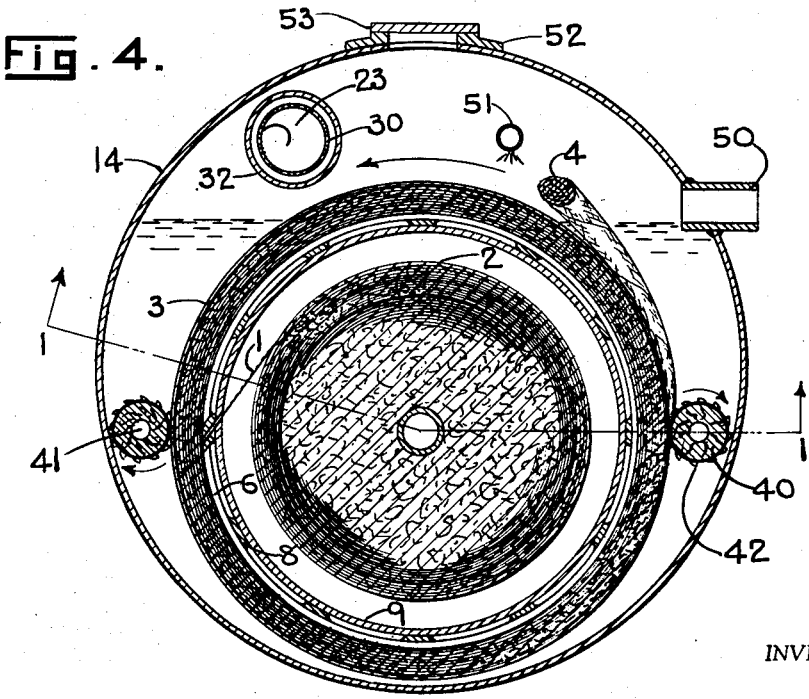
INVENTOR.
Fred W Manning Patented Nov. 17, 1942

2,302,622

UNITED STATES PATENT OFFICE 2,302,622

CONTINUOUS DEPTH FILTER HAVING AN INTERIOR CYLINDRICAL RETAINING WALL

Fred W. Manning, Palo Alto, Calif.

Application March 31, 1939, Serial No. 265,247

6 Claims. (Cl. 210—196)

This invention relates to filters in which filter beds of contiguous layers of treating material are moved in one direction while the fluids being treated filter therethrough in a counter direction, and is particularly adapted to the clarification of fluids for which filter aids have been used heretofore for precoating purposes; and this application is a continuation-in-part of my copending application, Serial No. 101,460, filed September 18, 1936, which in turn is a continuation-in-part of my copending application, Serial No. 750,460, filed October 29, 1934; both of which were subsequently issued as U. S. Patents Nos. 2,152,902, and 2,152,900, respectively.

It has been the practice heretofore to accomplish the clarification of liquid fluids by means of the passage of the fluid through one thickness of woven or felted fabric, which was usually given a precoating of some non-compressible solids, such as kieselguhr, to increase the rate of filtrate flow and to prevent the impurities from entering the fabric. If the precoating were thin, the flow rate dropped off rapidly with the clogging of the precoating, and the cycle of precoating, filtering, and cleaning of the filter wall, soon had to be repeated; if the precoating were of considerable depth, it was gradually removed at a uniform rate of speed, layer by layer as each became clogged, thereby prolonging and increasing the flow rate, but also reducing the clarity, as the precoating diminished in depth. To avoid the disadvantages incident to the cycle of building up, and washing, and removing, precoatings of non-compressible solids, surface type filters were developed, as described by U. S. Patents Nos. 2,055,872; 2,055,873; 2,055,874; and 2,055,927, dated September 29, 1936; in which rolls of preformed layers of fibres were used instead of the usual precoating solids. Altho such rolls can be introduced into a filter in a dry state for immediate use, and operated under suction or pressure in a completely submerged condition, and the soakage completely expressed therefrom during extrusion of the contaminated fabric from the filter, and all operations accomplished continuously; yet the main objection to all "precoating" and "surface type" filters remains; i. e., the flow rate of the filtrate is always greatly restricted due to the necessity of consolidating the solids sufficiently for all impurities to be removed by passage of the fluid through any one layer. This means, of course, that if the last layer of a precoat gives a finished filtrate, the total layers of the entire precoat will give a superfinished filtrate, which in the case of many fluids would result in the complete removal therefrom of all essential values, such as taste, color, and aroma, from fruit and vegetable juices, etc.

The clarification of elastic fluids, such as the scrubbing of air in air-conditioning units of private residences, has been accomplished by passing air through comparatively shallow mats of fibrous material, which were often coated with a viscous liquid for the purpose of collecting the dirt particles by adhesive impingement. Small installations were usually given but little attention, and the mats were sometimes neglected until they had become clogged with an excessive amount of filth, with the result that frequently the increased resistance to the air passing through a filter prevented all air circulation, and threw the entire air conditioning plant out of commission. Moreover, as dust particles are most active carriers of bacteria, the filter mats often changed from being an instrument of purification into a source of contamination for the air passing therethrough; and the furnace heating of dust particles not only made the latter more active, but the dry distillation of organic matter resulted in the formation of ammoniacal and other obnoxious gases, all of which accentuated the conditions conducive to making the filter mats a source of contamination.

It is will known to those versed in the art of filtration that the clarity and flow rate of the filtrate and the porosity and depth of the filter bed have definite relative values, and that the clarity can be maintained with a greatly increased flow rate providing the depth of the filter bed is sufficiently increased to compensate for the increased porosity of the solids that make up the bed. It is also known that the treatment of solids and fluids can be made much more effective by their contact in movement in counter directions.

The objects of the present invention are therefore to provide means whereby: the flow rate of a liquid filtrate is greatly increased by substituting "depth" filtration through a very porous filter bed of contiguous layers of fibrous material supported by an interior retaining wall, for "surface" filtration through a dense layer, or layers, or non-compressible solids in which each layer is supposed to be able to remove all objectionable solids from the liquid being filtered; the scrubbing of air, or other elastic fluid, is likewise accomplished at higher velocity through a filter bed of greater depth and smaller area than formerly; the flow rate and clarity of the filtered fluid is continuously maintained throughout the entire filtering operation; and the efficiency of the treating solids augmented by moving the layers in a direction counter to the flow of the fluid.

In accordance with one aspect of my invention, a plurality of contiguous layers of fibres are used to form a filter bed of comparatively great depth and porosity throughout which the impurities of the fluid being filtered are adsorbed or otherwise retained. As the bed becomes contaminated to a predetermined extent, a layer of fibres is removed from the fluid inlet surface of the bed, and in suitably timed relation with each such removal, a fresh layer is removed from a reserve roll and interposed between the fluid outlet surface of the bed and its retaining wall as the two are moved relatively to each other, the removal of the contaminated layers and the application of fresh layers causing the filter bed to move in a direction counter to the flow of the fluid. The amount of fresh fibres fed into filtering position should be substantially equivalent to the amount of contaminated fibres removed, the supply and removal of the fibres being regulated by one revolution of the filter bed, or continued for a predetermined interval controlled by a timing mechanism, and in either case, being repeated with sufficient frequency to maintain the filtering pressure, or the filtrate head, or the filtrate flow rate, substantially constant. The fibres may be applied to the filter bed in a discrete condition and removed therefrom in a similar state, as described in my U. S. Patent No. 2,055,869; but preferably, the fibres are bonded together by such materials as adhesive, reinforcing fibres, threads etc., to form a fabric the manufacture of which is described in my U. S. Patents No. 1,782,784; 1,782,785; 1,786,669; 2,152,901; and 2,218,338. The relative movement of the filter bed and retaining wall may be facilitated by withdrawing the bed away from the wall as described in my U. S. Patent No. 2,152,900; or by retracting the wall away from the bed as described in my U. S. Patent No. 2,152,902; or the relative movement of the bed and wall may be accomplished without either withdrawal of the bed or retraction of the wall, as hereinafter described.

The invention is exemplified in the following description, and one form of apparatus for carrying out the process is illustrated by way of example in the accompanying drawings, in which:

Fig. 3 is a cross-section of the filter taken on line 3—3 of Fig. 2.

Fig. 4 is a cross-section of the filter taken on line 4—4 of Fig. 1, showing how the filter may be operated in a horizontal position.

Figure 1:
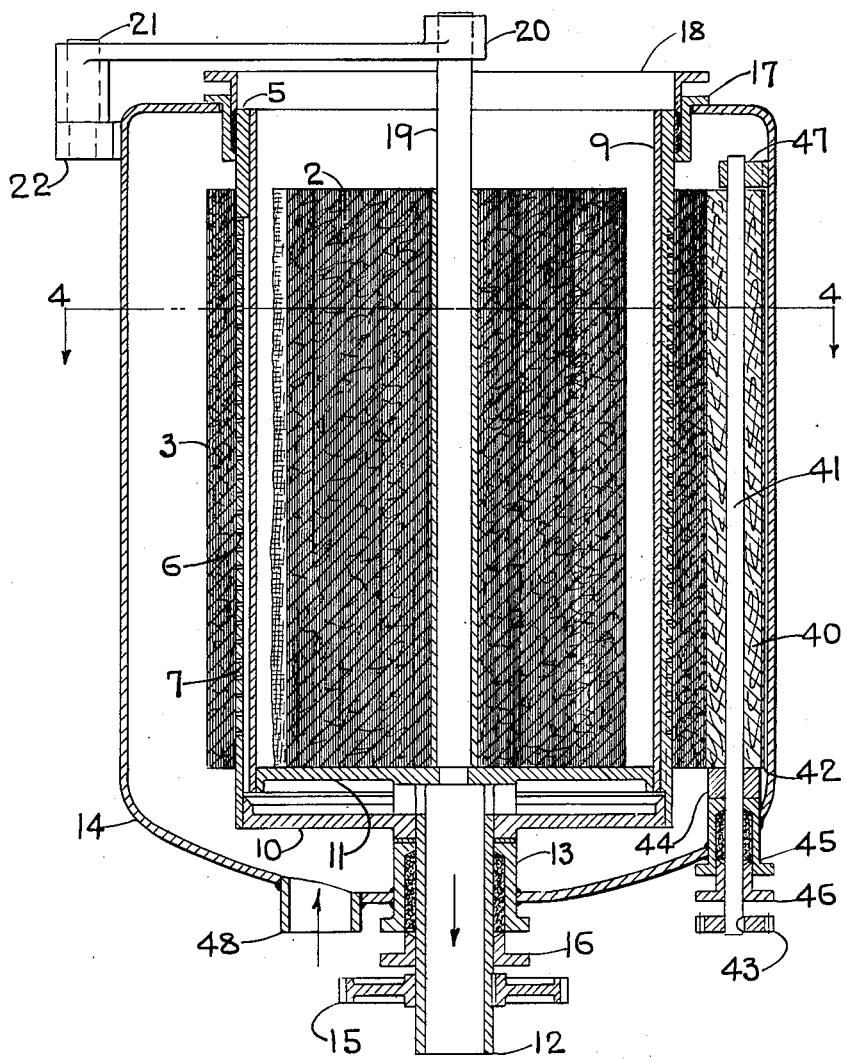
Fig. 1 is a vertical section of a closed filter taken on line 1—1 of Fig. 4.
Figure 2:
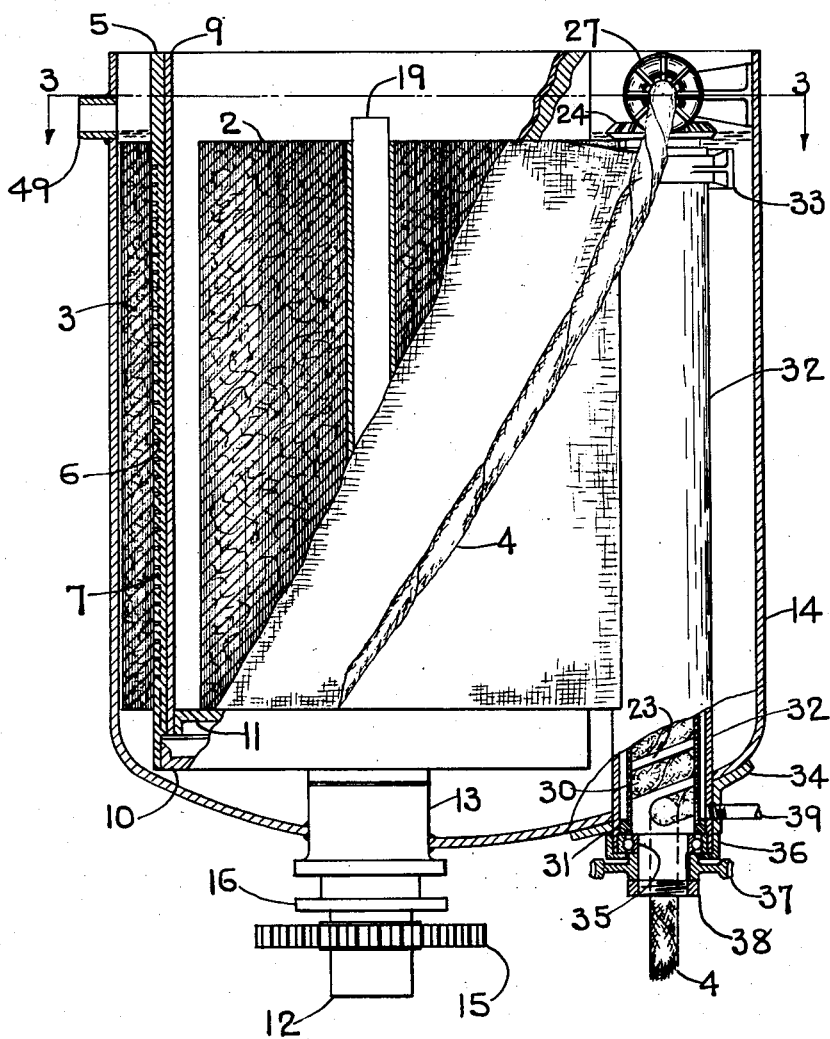
Fig. 2 is a vertical section of the filter taken on line 2—2 of Fig. 3, showing part of the filter bed in elevation, a portion of the extrusion screw in vertical section, and the filter tank with an open top.

Referring more specifically to the drawings by reference characters: A layer of fibres in the form of fabric 1 is drawn from a fresh supply roll 2 through a slot in the filtrate housing onto the fluid outlet surface of an annular filter bed 3, and is ultimately removed in a twisted condition from the fluid inlet surface of the bed as web 4, and extruded from the filter. The filtrate housing on which the filter bed is wound, consists of: retaining wall 5, which is divided by grooves 6 into annular rings 7 that are held in fixed position by ribs 8; retaining wall sleeve 9; outer end plate 10 of the retaining wall; and the inner end plate 11 of the retaining wall sleeve, the two end plates being spaced sufficiently apart to afford drainage of the filtrate from the annular spacing between the wall and sleeve to the outlet pipe 12 to which both end plates are rigidly attached. The outlet pipe is centralized, and the entire filtrate housing supported, by a stuffing-box 13, which is welded to the bottom of tank 14, the pipe being rotated by a gear 15 and the stuffing-box having a gland 16. When the filter is operated under pressure, or in a horizontal position, the spacing between the tank and housing at the open end of the filter may be closed, and the housing supported, by the stuffing-box 17 having a gland 18; and the outer end of spool shaft 19 lengthened to engage the support of the removable arm 20, the outer end of which is a sliding fit on a pin 21 that is fixed in a bracket 22. The fabric extrusion screw 23 is rigidly attached to, or integral with, an annular geared ring 24, which meshes with a smaller annular bevel gear 25 that is locked by means of a nut 26 on the deeply ribbed concentric twisting sleeve 27; and the latter rotates in a ball bearing 28, which is enclosed in a bracket 29 that is attached to the side of the filter tank. A foraminous cage 30 encloses the screw, and is centralized by rings 31 within pipe 32, which is held in a fixed position by a bracket 33 at its upper end and a filter tank flange 34 at its lower end. A ball bearing 35, enclosed within the lower end of the pipe by cap 36, takes the weight and also the thrust of the screw; and the screw is driven by a worm gear 37 that is held in fixed position on the outer end of the screw by a nut 38, pipe 39 affording drainage from the screw cage. The rolls 40 on shafts 41 are covered with carding belt 42 having saw shaped teeth; and are driven by gears 43, and supported and guided by collars 44, stuffing-boxes 45, glands 46, and upper bearing brackets 47. The fluid to be filtered enters at 48 and flows through the filter bed and out the filtrate housing, the excess overflowing at 49 if the filter tank is used with an open top in a vertical position, and overflowing at 50 if the tank is used with a closed top in a horizontal position. If used in the latter position, a liquid spray, or an elastic fluid, may be introduced at 51 for washing or drying purposes, the efficiency of which may sometimes make it necessary for the removal of the utilized fabric to be accomplished entirely above the liquid level in the tank. Handhold flange 52 having a cover 53 may be placed in any convenient position to enable the fabric to be threaded through the twisting member and screw when the filter is first placed in operation.

The operation of the apparatus thus constructed has been in part indicated in connection with the foregoing description, but before placing the filter in operation the filter bed must be formed. This may be accomplished by winding the filtrate housing with an extensible fabric, such as is described in my U. S. Patent No. 2,152,901, before the housing is placed in position within the tank; or it may also be accomplished after the filter parts have been assembled by threading the fabric from the supply roll through the housing slot, attaching its free end to a fixed position on the tank shell, and rotating the housing until a sufficient depth of bed has been formed, the fabric stretching as the housing is rotated to allow for the progressively increasing diameters of the windings. The outer end of the fabric can then be threaded by hand through the twisting sleeve and into the extrusion screw to be conveyed therethrough by rotation of the latter. The screw and cage may be placed almost entirely within the filter tank, or they may be placed exteriorly of the tank with the cage entrance attached to any convenient part of the tank, but preferably the entrance to the screw should be above the liquid level so as to decrease the amount of liquid to be expressed from the fabric. In any event, the position of the screw and twisting sleeve, and the direction of rotation and ratio of their connecting gears, result in the solids deposited on and in the first layer by passage of the liquid through the bed, being enclosed within the fabric as it is wrapped round and round upon itself, the rolling of the fabric being sufficient to compact the solids into a firmly twisted cord before it enters the screw, and the ribbing of the twisting sleeve allowing for considerable variations in the thickness of the fabric and the amount of solids wrapped therein. If no twisting sleeve is used, the pitch and diameters and position of the screw may be regulated to give the twisting action required to enwrap the filtered solids within the fabric and give the latter sufficient strength to rotate the filter bed upon its retaining wall during the removal of the utilized fabric from the bed through the screw.

The removal of the utilized fabric may be accomplished continuously or intermittently in various ways: The bed may be moved over a stationary wall by rotation of the carding rolls, the slack of the loosened fabric being taken up by the extrusion screw controlled by a friction clutch; or the bed may be moved over the wall by pull on the twisted fabric of the screw driven positively; or both bed and wall may be rotated together in frictional contact with each other, either the bed being moved as above described, or the wall being rotated by means of gear 15. Movement of the bed over the wall will also result in fresh fabric being inserted between the bed and wall; but if for removal of the utilized fabric both bed and wall are moved together, then for insertion of fresh fabric the wall must move in the opposite direction while the bed is held in fixed position by the carding rolls. Relative movements between the wall and bed are possible without retraction of the one, or withdrawal of the other, by virtue of the continuous drainage channels 6 between the rings 7 offering the minimum of resistance to such movements; all such intermittent movements may be made responsive to variations in the differential pressure, filtrate head, or filtrate flow rate; and the periods of duration of such movements may be controlled by timing devices, as described in my U. S. Patents Nos. 2,152,900; and 2,152,902.

It will be obvious from the foregoing description: that a counter-current movement of a fluid and treating solids may be accomplished by repeatedly, or continuously, adding a layer of the solids to one side of a filter bed supported by a retaining wall and passing a fluid therethrough from the opposite side, and a con-current movement of the fluid and solids accomplished by passing the fluid therethrough from the same side; that the insertion of a fresh layer, or the removal of a utilized layer, between the filter bed and retaining wall may be accomplished by movement of the bed upon the wall in a fixed position, or by movent of the wall upon the bed in a fixed position; and that the addition of a fresh layer to, or the removal of a utilized layer from, the side of the bed opposite a retaining wall may be accomplished by movement of the bed with or without the wall. If the movement of the layers is towards an interior cylindrical retaining wall or away from an exterior cylindrical retaining wall, the solids will progressively consolidate with each such movement of the layers; if the movement of the layers is away from an interior cylindrical retaining wall or towards an exterior cylindrical retaining wall, the solids will progressively open up with each such movement of the layers; but if both the movements of the layers and the fluid are away from an interior cylindrical retaining wall, the reinforcing threads of the layers will have to withstand the fluid differential pressure.

It will also be obvious: if the filter bed is moved in a direction counter to the flow of the liquid, the most utilized of the treating solids that make up the bed will come in contact with the first of the liquid to be treated and only fresh solids will be used for the final treatment of the liquid; consequently all of the solids will be utilized to a much greater extent, and a correspondingly smaller amount required, than if they were used through a mixing operation to form a filter wall precoat for a liquid to be filtered. Therefore, the distribution of the filtered solids throughout the depth of a bed of treating solids renewed continuously, or intermittently, will not only result in a greater flow rate but also in a greater amount of filtrate for any given clarity than can be obtained by mixing the same amount of treating solids in a liquid to form a precoat on a filter wall to aid the subsequent removal of other solids from the liquid, and without the disadvantages of time and equipment required for mixing and precoating operations. For example, a hydrocarbon oil can be dewaxed and decolorized by: diluting the oil with a solvent; mixing a decolorizing carbon with the diluted oil; chilling the mixture to precipitate the waxy constituents of the oil; maintaining a filter bed of treating solids at a low temperature while the wax and carbon are distributed upon the bed and throughout its depth by the oil passing through the bed in a direction opposed to the movement of the bed; subjecting the filtered wax and carbon, and filter bed solids, to a chilled medium, such as air, or hydrocarbon vapor, or other elastic fluid, or a liquid solvent, to remove the oil soakage; compressing the filtered wax and carbon, and treating solids, to expel an additional amount of oil; exposing the compacted wax and solids to heat, or solvent treatment, to separate one from the other; and separating the elastic fluid filtrate from the liquid fluid filtrate in a filtrate receiver by drawing off one of the filtrates. In other words, a fluid containing various impurities may be treated by primary solids mixed in the fluid in a discrete condition and separated therefrom by a con-current movement of the fluid and solids in a direction opposed to a countermovement of secondary treating solids in a unitary mass, the fluid passing through the mass and the primary solids being distributed upon and throughout the mass.

It will furthermore be evident that elastic fluids may be treated by liquid fluids and other elastic fluids for many different purposes in much the same way that liquid fluids are treated. For example, fabric for filters in air conditioning plants may be impregnated with a viscous germicidal fluid in vapor or other form during its manufacture or as the fabric is fed into position on the filter bed, and the air then treated counter-currently by its passage through the bed; or a viscous germicidal fluid may be distributed in vapor or other form throughout the air, and the latter then treated con-currently by its passage through the bed; and such treatment may be utilized to remove pollen, mold spores, yeast, bacteria, dirt, and objectionable odors and gases, the fabric layers being renewed sufficiently frequently to prevent the contaminations from penetrating the entire depth of the bed. Moisture may be added either con-currently or counter-currently in similar manner to humidify the air when the atmosphere is dry; and it may be continuously removed from the air through adsorption by hygroscopic solids in the fabric, and without regeneration of the solids, during passage of the air through a constantly renewed filter bed, the moisture being wrung from the fabric as the latter is extruded from the filter. The removal of the utilized fabric may be made responsive to the volume or velocity of the fluid, or to the resistance to the fluid, passing through the filter bed; and the addition of fresh fabric may be synchronized to compensate for the removal of the utilized fabric.

It will be understood throughout the appended claims: that "renewal of the filter bed" means either the addition of a layer of fresh treating solids to the fluid outlet surface of the bed, or the removal of an utilized layer of treating solids from the fluid inlet surface of the bed, or both; that the meaning of "addition of a layer of fresh treating solids" is to be distinguished over "the addition of fresh treating solids to form a layer"; and that "retaining wall" means any wall capable of supporting a filter bed against the pressure of the fluid passing therethrough and at the same time affording drainage for the filtered fluid, and this meaning may be extended to cover any wall upon which the bed is wound that will afford passage therethrough, or therebetween, of the filtered fluid, or the fluid to be filtered.

I claim as my invention:

1. A filtering process comprising: passing a fluid through a filter bed wall of contiguous layers of treating material supported by a foraminous retaining wall; moving the said walls relatively along their contacting portions while passing the said fluid through the filter bed wall under a differential pressure; and renewing the filter bed wall by removing therefrom, and adding thereto, successive layers of contaminated and fresh treating material, respectively during the said relative movement.

2. A filtering process comprising: passing a fluid through a filter bed wall of contiguous layers of treating material supported by a foraminous retaining wall; moving the said walls relatively along their contacting portions while passing the said fluid through the filter bed wall under a differential pressure; and interposing a fresh layer of treating material between the said walls during the said relative movement.

3. A filtering process comprising: passing a fluid through a filter bed wall of contiguous layers of treating material supported by a foraminous retaining wall; moving the said walls relatively along their contacting portions while passing the said fluid through the filter bed wall under a differential pressure; and removing an utilized layer of treating material from the fluid inlet side of the filter bed wall, and adding a fresh layer of treating material to the fluid outlet side of the filter bed wall during the said relative movement.

4. In a filter, the combination of: a casing; a filter wall of contiguous layers of filter material and a reserve supply of fresh filter material within the said casing; an elastic fluid inlet communicating with an unsubmerged portion of the said casing, and a liquid fluid outlet communicating with a submerged portion of the said filter wall, whereby a liquid fluid may be passed through the said submerged portion of the filter wall under a differential pressure maintained by an elastic fluid in the said unsubmerged portion of the casing; means for removing an utilized surface layer of filter material from the fluid inlet side of the filter wall; and means for transferring material from the reserve supply to form a fresh layer on the fluid outlet side of the filter wall.

5. In a filter, the combination of: a filter wall of contiguous layers of filter material; a cylindrical foraminous retaining wall for supporting the said filter wall; a reserve supply of fresh filter material; a casing enclosing the said filter wall, retaining wall, and reserve supply; an inlet communicating with the casing and an outlet communicating with the filter wall whereby a fluid may be passed through the filter wall; means for removing an utilized surface layer of filter material from the fluid inlet side of the filter wall and extruding the said layer from the casing; and means for moving the filter and retaining walls relatively whereby fresh filter material is transferred from the said reserve supply and interposed between the said walls.

6. In a filter, the combination of: a filter wall of contiguous layers of filter fabric; a cylindrical foraminous retaining wall for supporting the said filter wall; a reserve supply of fresh filter fabric; a casing enclosing the said filter wall, retaining wall, and reserve supply; an inlet communicating with the casing and an outlet communicating with the filter wall whereby a fluid may be passed through the filter wall; an extrusion screw connected to the casing for removing an utilized surface layer of filter fabric from the fluid inlet side of the filter wall and extruding the said fabric from the casing; and means for removing the filter and retaining walls relatively whereby fresh filter fabric is transferred from the reserve supply and interposed between the said walls.

FRED W. MANNING.